US00RE35104E

United States Patent [19]

Murakami et al.

[11] E Patent Number: Re. 35,104

[45] Reissued Date of Patent: Nov. 28, 1995

[54] SUBRATE MULTI-MEDIA DATA TRANSMISSION SYSTEM

[75] Inventors: Tokumichi Murakami; Koh Kamizawa, both of Kanagawa, Japan

[73] Assignee: Mitsubishi Denki Kabushiki Kaisha, Tokyo, Japan

[21] Appl. No.: 8,834

[22] Filed: Jan. 25, 1993

Related U.S. Patent Documents

Reissue of:

[64] Patent No.: 4,864,562
Issued: Sep. 5, 1989
Appl. No.: 134,081
Filed: Dec. 17, 1987

U.S. Applications:

[63] Continuation of Ser. No. 751,779, Aug. 29, 1991, abandoned.

[30] Foreign Application Priority Data

Dec. 18, 1986 [JP] Japan ..... 61-302580

[51] Int. Cl.[6] ..... H04J 3/22

[52] U.S. Cl. ..... 370/84; 370/110.1; 370/99; 370/112

[58] Field of Search ..... 370/84, 112, 99, 370/100.1, 110.1, 60, 60.1, 94.1, 94.2, 95.1, 95.3

[56] References Cited

U.S. PATENT DOCUMENTS

| | | | |
|---|---|---|---|
| 4,063,038 | 12/1977 | Kaul et al. | 370/84 |
| 4,589,108 | 5/1986 | Billy | 370/84 |
| 4,631,720 | 12/1986 | Koeck | 370/84 |
| 4,658,152 | 4/1987 | Walters | 370/99 |
| 4,727,536 | 2/1988 | Reeves et al. | 370/84 |
| 4,740,963 | 4/1988 | Eckley | 370/84 |
| 4,752,923 | 6/1988 | Allen et al. | 370/84 |
| 4,763,317 | 8/1988 | Lehman et al. | 370/60 |
| 4,763,319 | 8/1988 | Rozenblit | 370/84 |
| 4,763,322 | 8/1988 | Eizenhofer | 370/84 |
| 4,792,944 | 12/1988 | Takahashi et al. | 370/84 |

OTHER PUBLICATIONS

International Telegraph and Telephone Consultative Committee (CCITT), Draft for Part 3 of Recommendation H.130, Jul. 1985, pp. 69–77.

Robert M. Gray, "Vector Quantization", IEEE ASSP Magazine, Apr. 1984, pp. 4–29.

Tokumichi Murakami et al., "Dynamic Multistage Vector Quantization of Images", Electronics and Communication in Japan, Part 1, vol. 69, No. 3, 1986, pp. 93–101.

T. Murakami et al. "Vector Quantizer of Video Signals", Electronics Letter 11th, 1982, vol. 18, No. 23, pp. 1005–1006.

*Primary Examiner*—Douglas W. Olms
*Assistant Examiner*—Min Jung
*Attorney, Agent, or Firm*—Rothwell, Figg, Ernst & Kurz

[57] ABSTRACT

A [substrate] *sub-rate* multimedia data transmission control system in which transmission frame bits set in a unit of a transmission frame having a repeating cycle of 8 KHz according to the present invention enables it to effect a realtime multiplexed bit allocation in the 8 kbps unit in a variable fashion such that an automatic matching of a transmission frame is achieved at an initiation of a transmission and error check bits of the error correction code are contained in a transmission frame with a satisfactory matching. In addition, the multiframe configuration according to the present invention enables it to handle in an integrated fashion the synchronizations of the voice data frame, the error correction frame, and the video data packet, which as a result minimizes the size of the buffer memories disposed to send and/or to receive motion video and which enables the transmission speed smoothing operation to be accomplished in a simple configuration through an easy control.

15 Claims, 9 Drawing Sheets

SUBRATE MULTI-MEDIA DATA TRANSMISSION SYSTEM

Matter enclosed in heavy brackets [ ] appears in the original patent but forms no part of this reissue specification; matter printed in italics indicates the additions made by reissue.

*This is a continuation of application Ser. No. 07/751,779, filed Aug. 29, 1991, now abandoned, which is a Reissue application of an application Ser. No. 07/134,081, filed Dec. 17, 1987, having a U.S. Pat. No. 4,864,562.*

BACKGROUND OF THE INVENTION

1. Field of the Invention

The present invention relates to a sub-rate multimedia data transmission control system for transmitting information such as a motion video, a voice, and data at a sub-rate.

2. Description of the Prior Art

FIG. 8 is a diagram schematically showing a configuration example of a transmitter according to the conventional sub-rate multi-media data transmission system described, for example, in the CCITT Draft Recommendations H.130 Part 3 in which the configuration includes a motion video encoder 1, a transmission buffer 2 for interfacing or matching the code transmission speed with the encoded output delivered from the [moving] picture encoder 1 of which the amount of the encode data is not uniform, a video image frame data 3 read from the transmission buffer memory 2 at a code transmission speed, an error correction encoder 4 for effecting a (255, 239, 5) BCH encoding operation on the video image frame data 3, an error correction frame data 5 outputted from the error correction encoder 4, a 16-phase interleaver 6 for achieving a 16-phase interleaving operation on the error correction frame data 5, video image data 7 delivered from the 16-phase interleaver 6, a voice encoder 8, voice data 9 transmitted from the voice encoder 8 at a speed of 64 kbps, digital data 10 having various speeds, an external data multiplexing section 11 for multiplexing the digital data 10 with a speed conversion so as to transmit the data at a speed of 64 kbps, external data 12 sent from the external data multiplexing section 11 at a speed of 64 kbps, a control section 13 between apparatuses which effects a communication control with communicating apparatuses, control data 14 outputted from the control section 13 at a speed of 32 kbps, a multiplexed control signal 15 delivered from the control section 13, a multiplexing section 16 for multiplexing the video data 7, the voice data 9, the external data 12, and the control data 14 so as to send these data at a speed of 1.544 Mbps, and a transmission frame 17 sent from the multiplexing section 16 at a speed of 1.544 Mbps.

FIG. 9 is a schematic diagram illustrating a transmission frame configuration of the transmission apparatus of FIG. 8 according to the conventional sub-rate multi-media data transmission control system. The configuration includes transmission data 17 at a speed of 1.544 Mbps in which a transmission frame comprises 193 bits, a transmission frame bit $F_r$ 20 assigned to each transmission frame of the transmission data 17 and the use of which is repeated at an interval of 24 transmission frames, an odd-numbered frame 21 obtained by classifying the transmission data 17 into odd-numbered frames and even-numbered frames respectively, and similarly an even-numbered frame 22 thereof.

FIG. 10 is a schematic diagram showing a process in which the motion video data 3 is encoded for a transmission path in the transmission apparatus of FIG. 8 according to the conventional sub-rate multi-media data transmission control system. The configuration comprises a unique code word 30 indicating the top of a video image frame, encoded data of the first block line 31 located at the uppermost end of a screen when a video frame is structured in the screen in which a block line includes several lines in the horizontal direction and the block line is assigned as the minimum encoding unit, encoded data of the second block line 32 formed in the similar fashion, encoded data of the n-th block line (n is an integer at least equal to one) 33 similarly located at the lowermost end of the screen, 256-bit error correction frame data 5 which is obtained by effecting the (255,239, 5) BCH encoding on a 239-bit unit data beginning from an arbitrary position of the video image data and thereafter by adding an error correction frame bit 34, an error correction frame bit S which identifies a division point of the 16-phase interleave and a division point of the error correction frame and of which the utilization is repeated at an interval of 16 error correction frames, an information bit 35 of the 239-bit (255, 239, 5) BCH code obtained by dividing the image data 3 at an arbitrary position, a 16-bit error correction code Ecc 36 added to the information bit 35, transmission video image data 7 attained by effecting a 16-phase interleaving on the error correction frame 5, and data 38 obtained by achieving the 16-phase interleaving on the error correction frame 5 excepting the error correction frame bit S.

Next, the operation of the configuration above will be described. The encoded output resulting from the encoding operation of the motion video encoder 1 is temporarily stored in the transmission buffer memory 2 and thereafter is read therefrom at a code transmission speed, thereby matching the encode speed with the code transmission speed. The video image data 3 read from the transmission buffer 2 is inputted to the error correction encoder 4, which effects the (255, 239, 5) BCH encoding on the data to attain the error correction frame data 5. Next, the video data 7 having undergone the 16-phase interleave operation in the 16-phase interleaver 6 is sent to the multiplexer 16 so as to be multiplexed into transmission data at a speed of 1.544 Mbps. On the other hand, the voice data 9 encoded by the voice encoder 8 is fed to the multiplexing section 16 at a speed of 64 kbps. The digital data 10 at various speeds, for example, 1200 bps and 2400 bps [data is] *is data* multiplexed by the external multiplexing section 11 according to the procedure described in, for example, the CCITT Recommendations X.50 into the external data 12 at a speed of 64 kbps and is then delivered to the multiplexer 16. In the controller 13 between apparatuses, information necessary to be sent to a communicating apparatus for the communication control with the communicating apparatus is delivered as control data to the multiplexer 16 at a speed of 32 kbps.

In the multiplexing section 16, the video data 7, the voice data 9, the external data 12, and the control data are multiplexed into a transmission frame 17 at a speed of 1.544 Mbps according to the predetermined frame configuration indicated by the multiplex control signal 15 sent from the controller 13 between apparatuses, thereby transmitting the multiplexed data to a transmission line.

Next, referring to FIG. 9, description will be given of the transmission frame configuration. According to the CCITT Draft Recommendations H.130 Part 3, the transmission is accomplished at a transmission rate of a so-called Primary Group (1.544 Mpbs) and a transmission frame 17 includes 193 bits; consequently, the frame repeat cycle is obtained as 1.544 Mbps/193 bits=8 kHz. Assume that bit 0 of the transmission frame 17 is a frame bit $F_r$ 20 and that the remaining 192 bits ranging from bit 1 to bit 193 are assigned to an information channel. The utilization of the frame bit $F_r$ 20 is repeated for each 24 frames according to the CCITT *Data.* Recommendations G.704 and information such as the frame synchronization, the multiframe synchronization, the data link, and the CRC-6 are subjected to a time-sharing operation. The information bits of a transmission frame 17 are subdivided into items [TS1–TS≧] *TS1–TS24* each comprising 8 bits, and the multi-media data is multiplexed according to this unit.

First, the 24 multiframes are classified into odd-numbered frames 21 and even-numbered frames 22, TS1 and TS16 are respectively assigned to the voice data 9 and the external data 12, and TS2 of the odd-numbered frame 21 is assigned to the control data 14. The TS other than those above are assigned to the video image data 7. As a result, the multiplexing rate of each data becomes as follows.

Frame bit $F_r$ 20: 1 bit×8 KHz=8 Kbps

Voice data 9: 8 bits×8 KHz=64 Kbps

External data 12: 8 bits×8 KHz=64 Kbps

Control data 14: 8 bits×8 [KHz ½] *KHz*×½=32 Kbps

Video data 7: 1.376 Mbps

In general, the bit synchronization and the 8-bit octet synchronization must be retained for the 64 Kbps voice data. In this case, however, the octet synchronization is established based on a fact that the data is multiplexed in the transmission frame 17 in a unit of eight bits.

For the external data 12, a frame pattern conforming to, for example, the CCITT Recommendations X.50 is inserted into the external data channel TS16 thereof so as to establish the frame synchronization independent of the synchronization of the transmission frame 17.

For the motion video data 7, since the required [bits] *bit* error rate thereof is critical in general as compared with the error rate of the ordinary transmission path, the transmission path error countermeasurement is effected through the (255, 239, 5) BCH encoding and the 16-phase interleaving operation. Consequently, the start bit of the 16-phase interleaving and the start bit of the (255, 239, 5) BCH are required to be identified, and hence the error correction frame 5 is configured and the frame synchronization thereof is established independent of the synchronization of the transmission frame 17.

Finally, referring to FIG. 10, description will be given of the configuration of the error correction frame 5. In the [motion] video data 3, corresponding to each block line as the encode unit, there are arranged encoded data for a video frame the first block line 31, the second block line 32, . . . , and the n-th block line 33 located at the lowermost position in the screen, and the unique word $F_s$30 identifying the division point of the video frame is added at the top of the data, thereby forming the video frame data 3. Next, subdividing the video frame data 3 from an arbitrary bit position in a unit of 239 bits, a 1-bit error correction frame bit S 34 and an error correction bit ECC 36 of the BCH code are added to the 239-bit unit so as to constitute a 256-bit error correction frame 5. Finally, the 16-phase inter-leave operation is achieved in a unit of [16correction] *16 correction* frames 5 excepting the frame bit S 34, thereby forming the video data 7 to be multiplexed for a generation of the transmission frame 17. In general, since the amount of information of the video frame data 3 is not uniform for each video frame, in order to match the amount of information with the fixed code transmission speed, there is disposed the transmission buffer 2 of FIG. 8 to effect the speed smoothing or matching operation. However, since the capacity of the buffer memory 2 is limited, there may possibly arise an overflow state and an underflow state. In order to prevent such disadvantageous states, according to the CCITT Draft Recommendation H.130 Part [B] *3*, there is introduced a control method, namely, the motion video encoder 1 of FIG. 8 stops the encode operation when an overflow occurs, whereas at an occurrence of an underflow state, the pertinent information is forcibly generated by use of, for example, the fixed-length encoding scheme. Furthermore, with consideration of a delay of a response in the control method, the capacity of the buffer memory is increased. The buffer memory occupancy is restricted to be 180 kbits on the transmission side and 220 kbits on the reception side, and the delay associated with the smoothing operation is set to be a relatively large value of about 165 milliseconds (ms).

Since the conventional sub-rate multi-media data transmission control system is configured as described above, there arise the following problems, namely, the transmission frame synchronization must be established independently of the error correction frame synchronization, the size of the apparatus is increased, a long period of time is required to establish all frame synchronizations when the system is applied to the sub-rate ranging from 64 kbps to 384 kbps and hence a countermeasurement is necessary, the capacity of the buffer memory is increased and the configuration of the apparatus is accordingly complicated, and a greater amount of delay occurs in the smoothing operation of the motion video data, which causes a considerable hindrance in case of the sub-rate ranging from 64 kbps to 384 kbps.

SUMMARY OF THE INVENTION

It is therefore an object of the present invention to provide a sub-rate multi-media data transmission control system solving the problems above in which synchronizations of the error correction frame, the voice data frame, and the transmission frame can be simultaneously established by use of a simple frame configuration and the multi-media data at a sub-rate of 64 kbps×$N_1$ ($N_1$ is an integer exceeding 1) can be multiplexed with a satisfactory matched operation.

Another object of the present invention is to provide a sub-rate multi-media data transmission control system which can adaptively effect a multiplexing operation with respect to the transmission rate and the multiplex configuration so as to effectively utilize transmission lines.

According to the present invention, there is provided a sub-rate multi-media data transmission control system having a configuration in which a multiplexing rate is adaptively assigned to a transmission frame unit having a repeating cycle of 8 KHz; the multiframe cycle, the error correction frame cycle, and the voice data frame cycle are matched with each other; furthermore, the [motion] video data packet is matched with the error correction frame so as to adaptively transmit the video data frame and the dummy data frame according to this unit of the frame.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENTS

Figure 1:
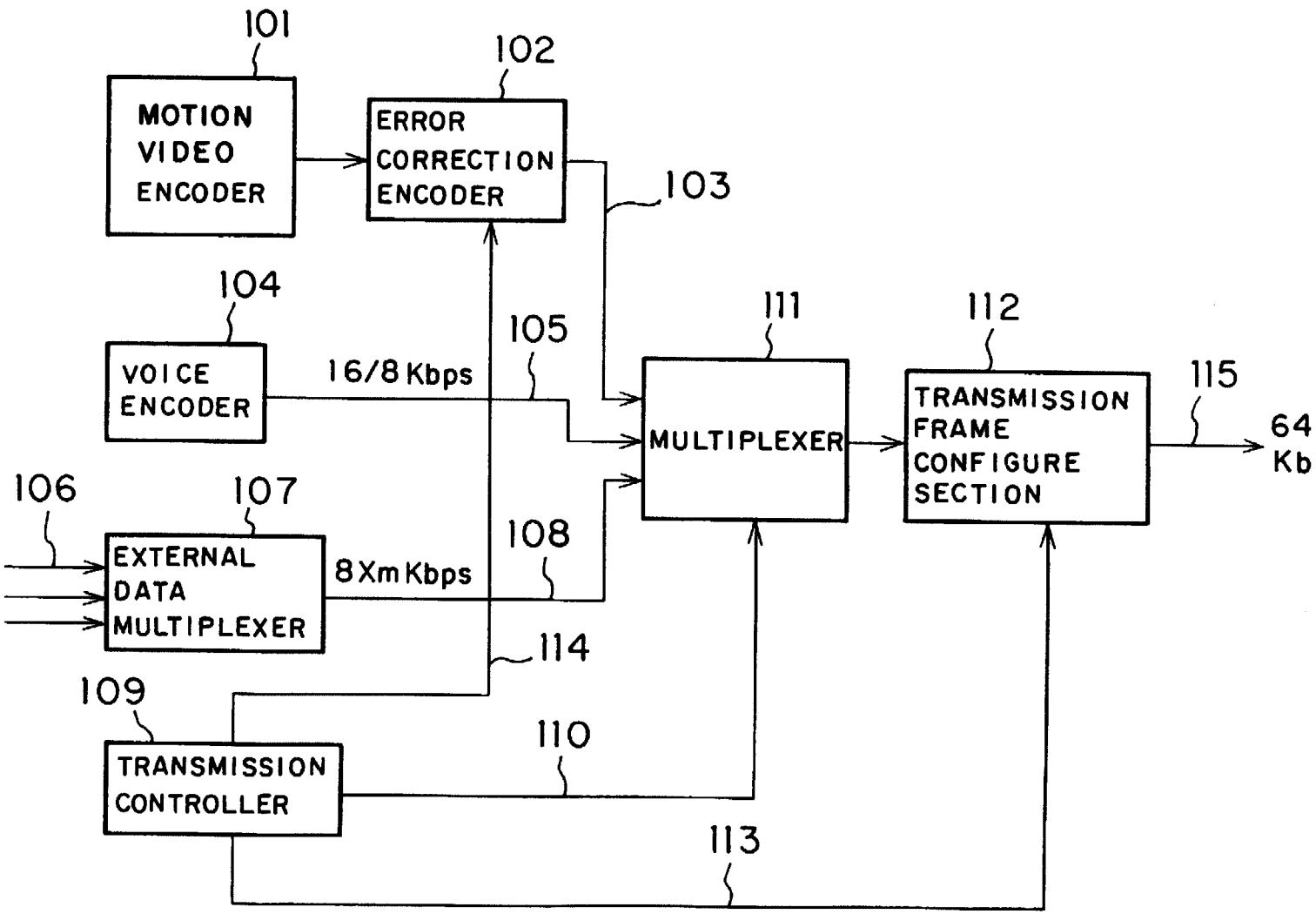
FIG. 1 is a configuration diagram schematically showing a sub-rate multi-media data transmission control system according to an embodiment of the present invention.

Referring now to FIGS. 1–7, a description will be given of an embodiment according to the present invention. The configuration of FIG. 1 includes a motion video encoder 101, an error correction encoder 102 for effecting, for example, the (640, 620, 5) shortened BCH encoding on the encoded output delivered from the motion video encoder 101, motion video data 103 outputted from the error correction encoder 102, a voice encoder 104, a voice encoded data 105, for example, of 16/8 kbps, various external digital data 106, an external data multiplexing section 107 which multiplexes the external digital data 106 to attain external data of 8×m kbps (m is an integer at least equal to one) by expanding the procedure, for example, of the CCITT Recommendations X.50, control data 110 transmitted from a transmission control section 109 to a communicating apparatus, a multiplexing section 111 which adaptively multiplexes the [motion] video data, the voice data 105, the external data 108, and the control data 110, a transmission frame configure section 112 to form a transmission frame with a variable transmission speed of 64/128 kbps, a control signal 113 outputted from the transmission controller 109 to control the operation of the transmission frame configure section 112, a control signal 114 delivered from the transmission controller 109 to control the operation of the error correction encoder 102, and a transmission frame 115 outputted from the transmission frame configure section 112 at a variable transmission speed of 64/128 kbps.

Figure 2:
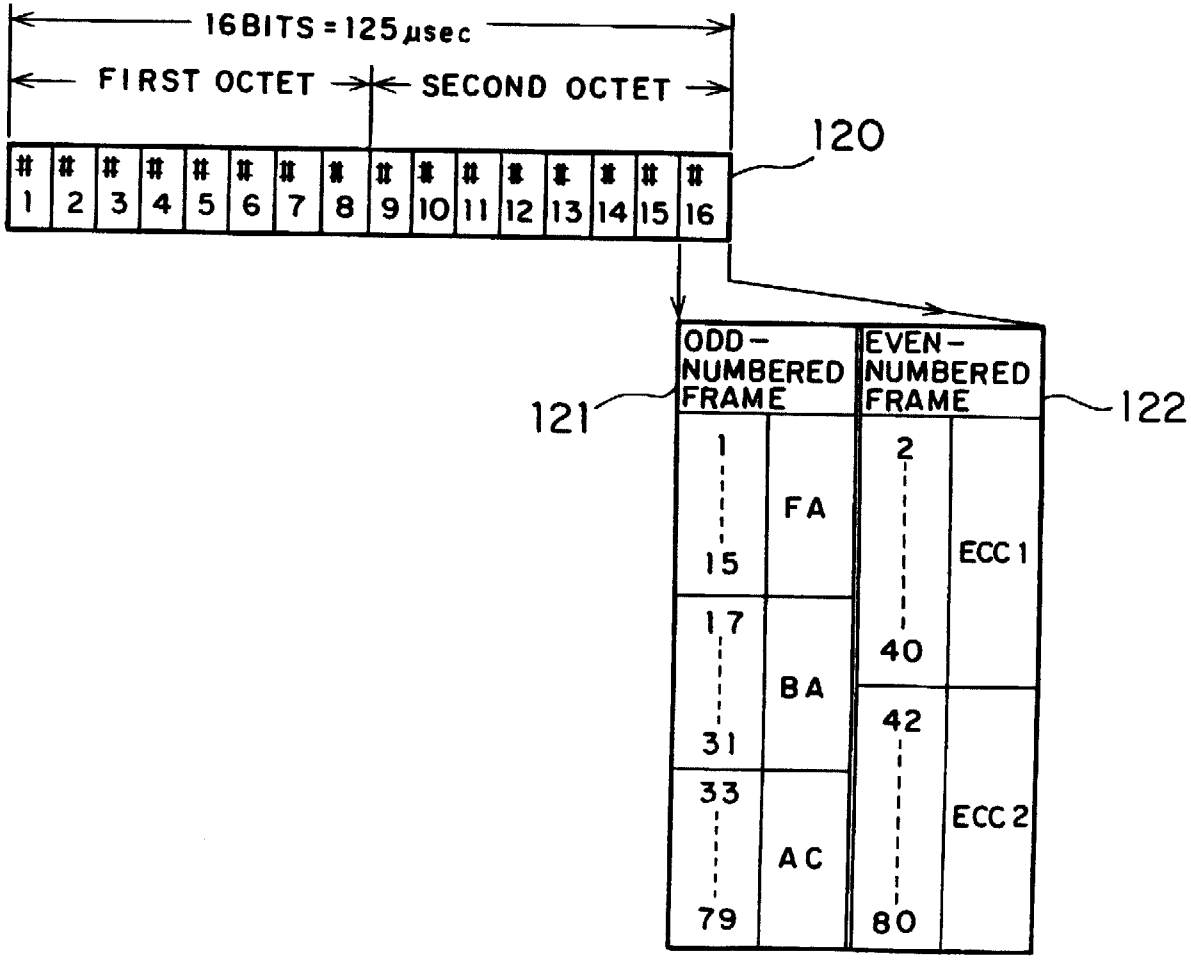
FIG. 2 is a schematic diagram illustrating the configuration of a transmission frame of the embodiment according to the present invention.

FIG. 2 is a diagram showing a transmission frame configuration in a case where the transmission frame 115 of FIG. 1 can be changed over between 64 kbps and 128 kbps in which the configuration includes a transmission frame 120 having a frame repeating cycle of 8 KHz, contents 121 of an odd-numbered frame corresponding to the #16 bit, and contents 122 of an even-numbered frame associated with the #16 bit. The odd-numbered frame and the even-numbered frame constitute a multiframe including, for example, 80 transmission frames.

Figure 3:
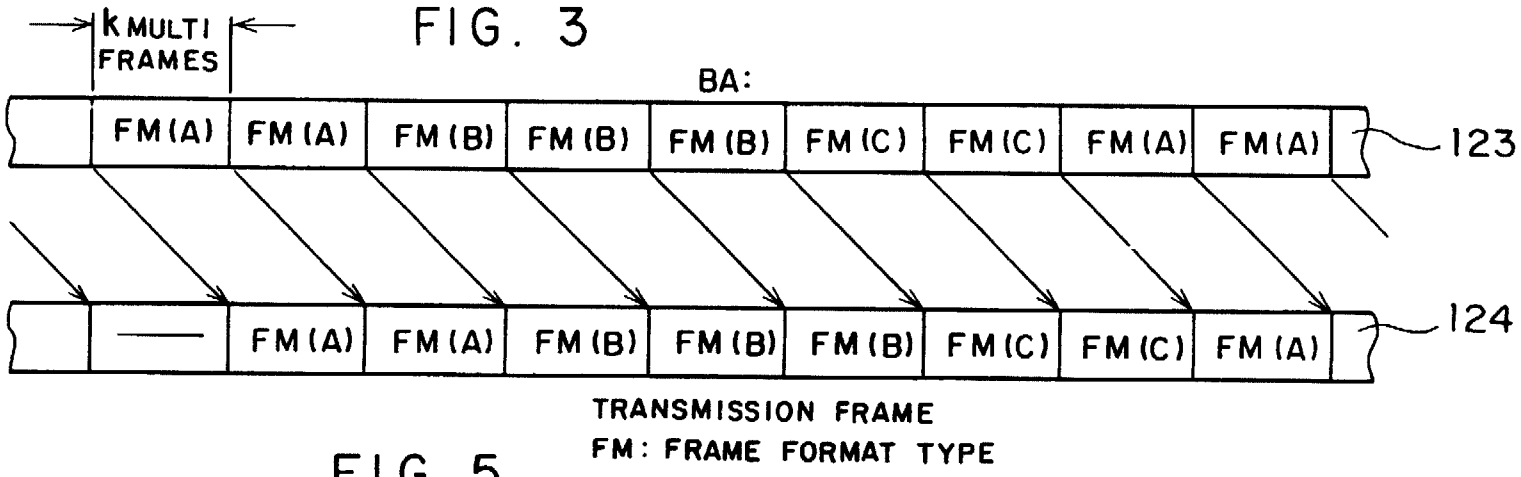
FIG. 3 is an explanatory diagram useful to explain the correspondence of the pertinent bit allocation or assignment in the embodiment according to the present invention.

FIG. 3 is a diagram illustrating a utilization example of transmission frame format information BA contained in an area ranging from the 17th frame to the 31st frame in the contents 121 of the odd-numbered frame corresponding to the #16 bit of FIG. 2. The configuration includes transmission frame format information BA (123) indicated in a unit of k multiframes (k is an integer at least equal to one) and a transmission frame 124 of which the format is changed after a delay of [1] *k* multiframes with respect to the transmission frame format BA 123.

Figure 4:
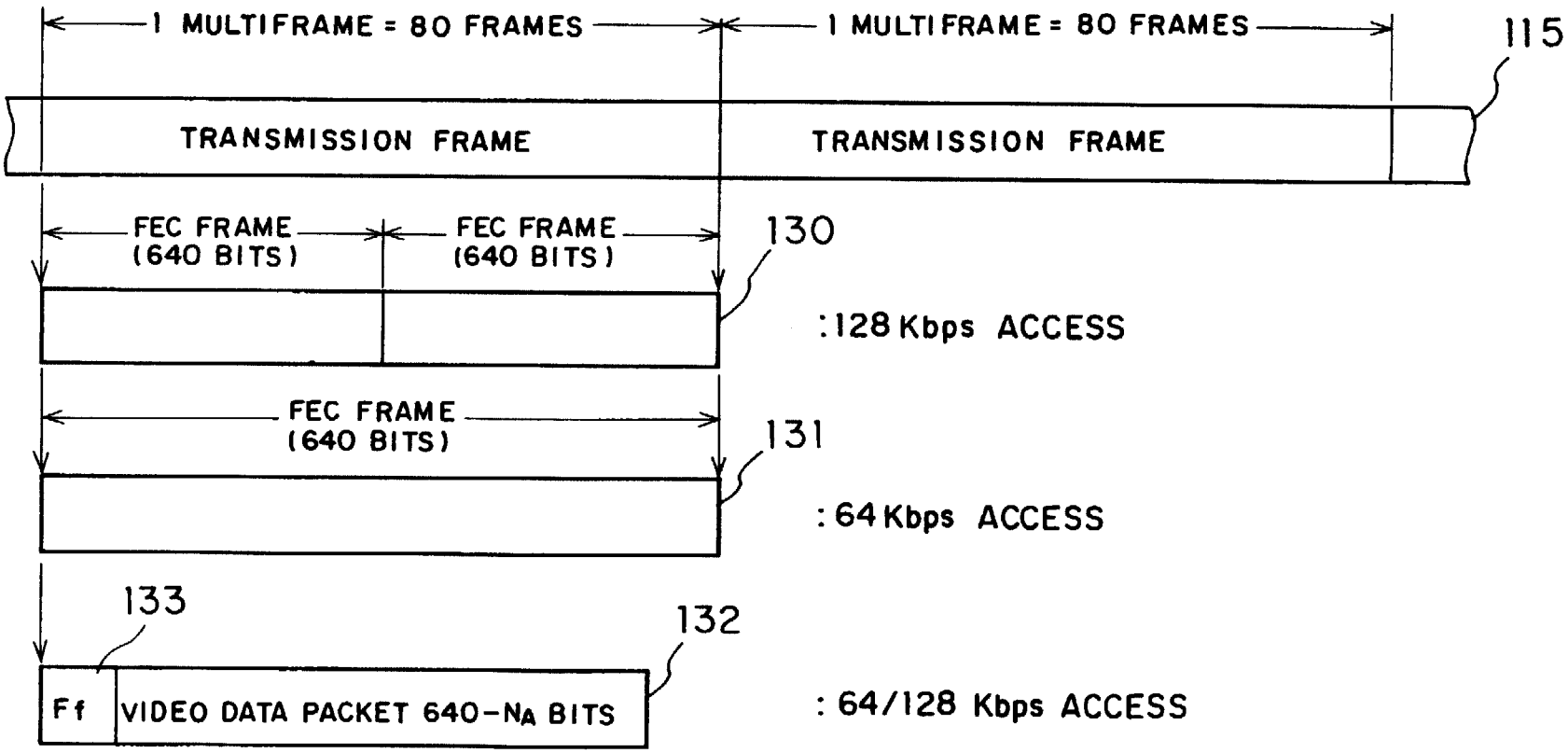
FIG. 4 is a schematic diagram illustrating the configurations of the transmission frame, the FEC frame, and the video packet of the embodiment according to the present invention.

FIG. 4 is a diagram showing the correspondence between the transmission frame 120 of FIG. 2 and the FEC frame as a unit of the (640, 620, 5) shortened BCH codes in which the configuration includes an FEC frame structure 130 at a 128 kbps access, an FEC frame structure 131 at a 64 kbps access, a fixed-length video data packet 132 formed in a unit of the FEC frame, and a flag $F_f$133 indicating whether or not the [motion] video data channel 132 is valid.

Figure 5:
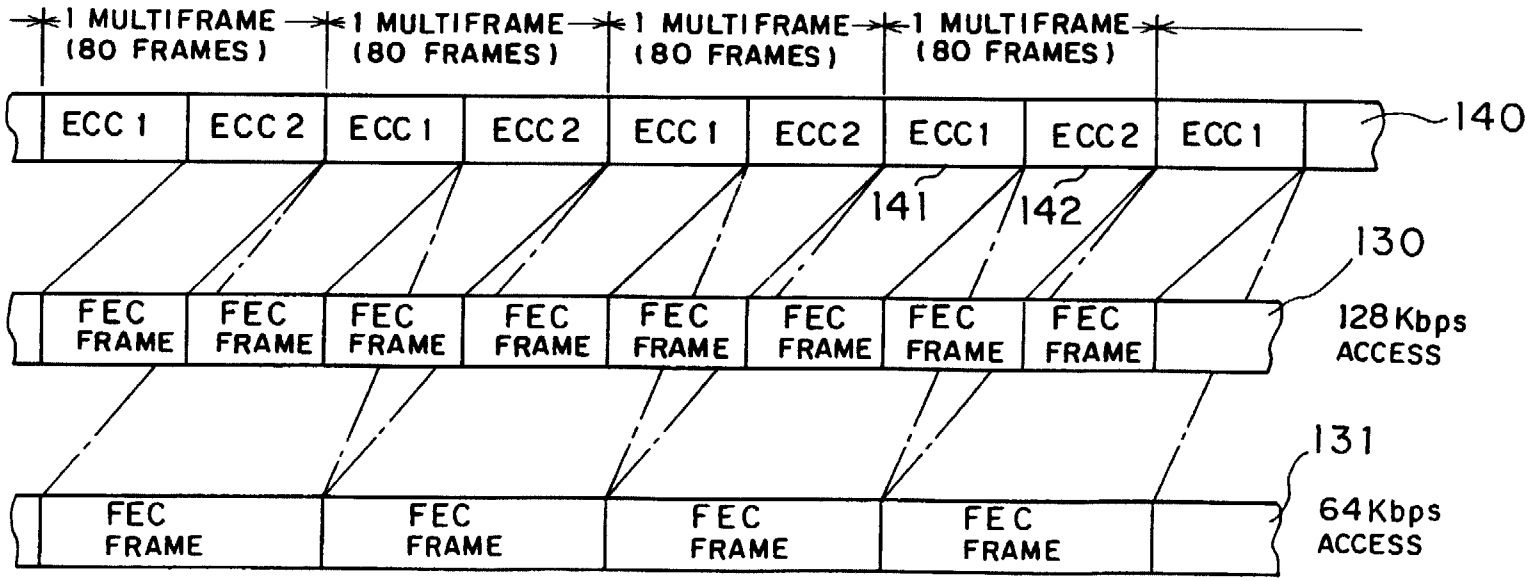
FIG. 5 is an explanatory diagram useful to explain the correspondence between the FEC frame and the ECC of the embodiment according to the present invention.

FIG. 5 is a diagram showing an example of transmission of an error correction bit ECC of the (640, 620, 5) shortened BCH codes to be transmitted depending on the contents 122 of the even-numbered frame associated with the #16 bit of FIG. 2. The configuration includes an error check bit ECC 140 to be sent in association with each multiframe, an FEC frame 130 at a 128 kbps access, and an FEC frame 131 at a 64 kbps access.

Figure 6:
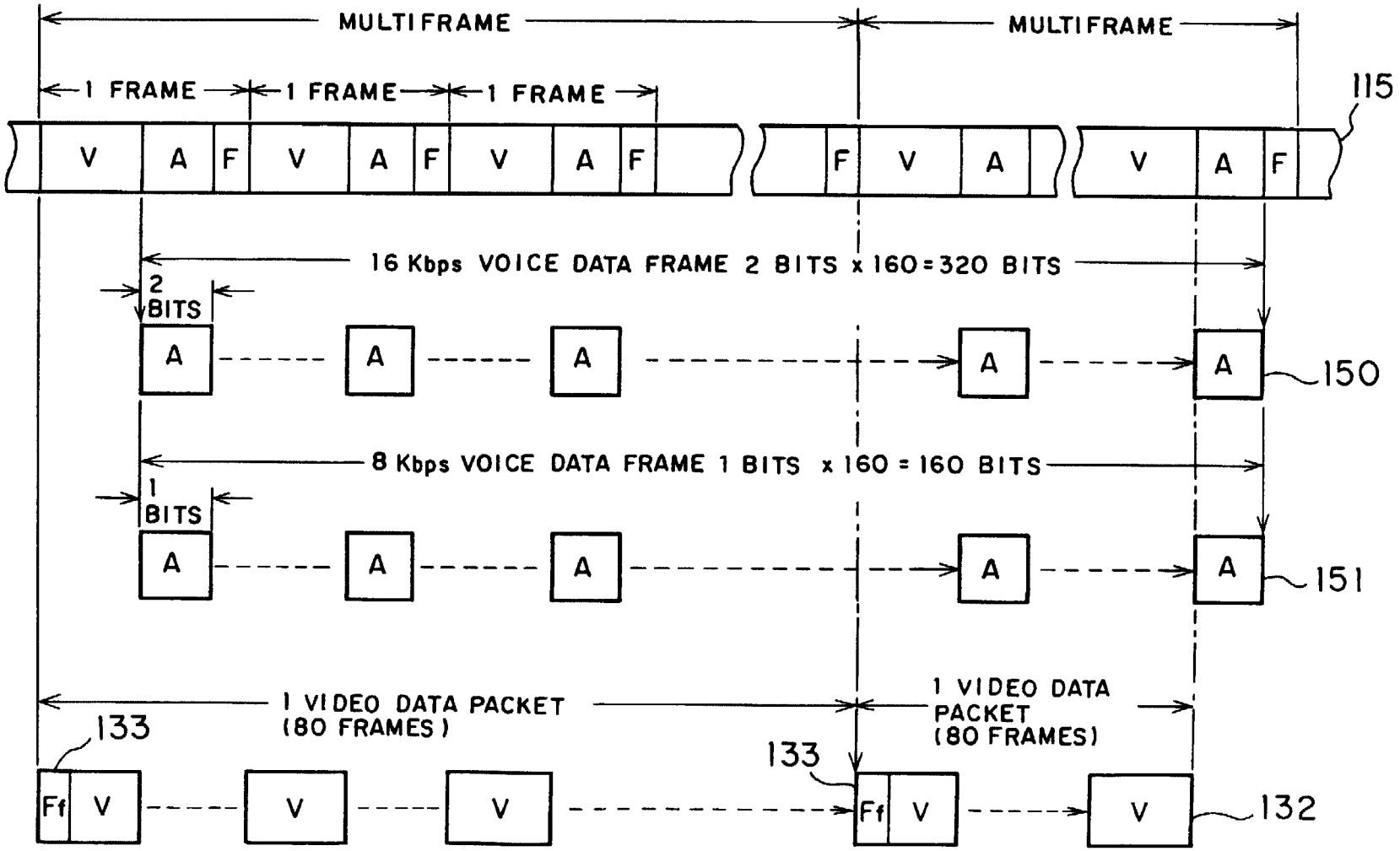
FIG. 6 is an explanatory diagram useful to explain the correspondence between the transmission frame and the voice data frame of the embodiment according to the present invention.

FIG. 6 is a diagram illustrating the correspondence between the transmission frame 115 of FIG. 1 and the voice data frame, for example, resulting from a 16/8 kbps high-performance encoding operation. The configuration of FIG. 6 comprises, for example, a 320-bit voice *data* frame 150 of 16 kbps and a 160-bit voice data frame 151 of 8 kbps.

Figure 7:
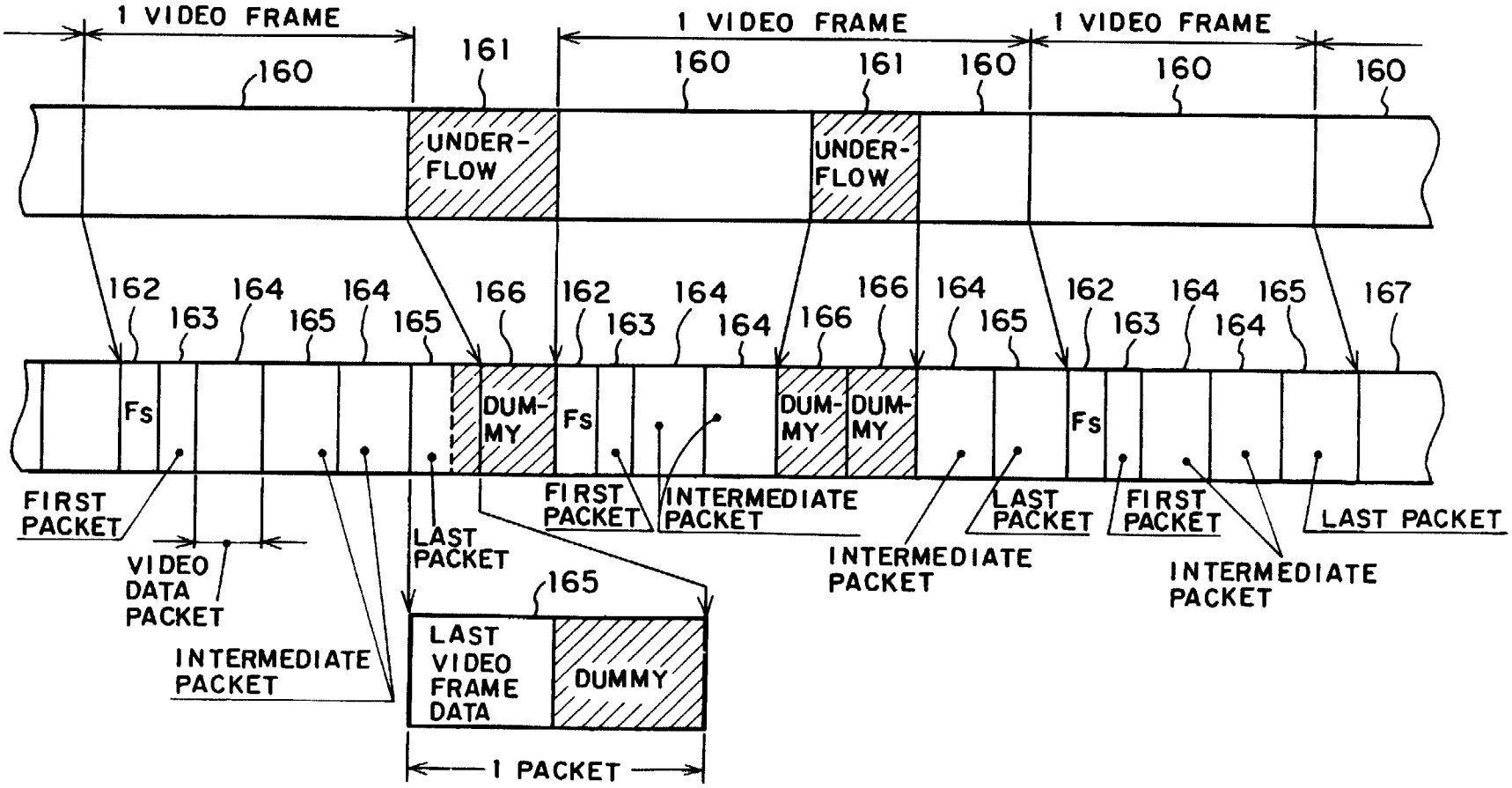
FIG. 7 is an explanatory diagram useful to explain the correspondence between the video frame and the video data packet of the embodiment according to the present invention.
Figure 8:
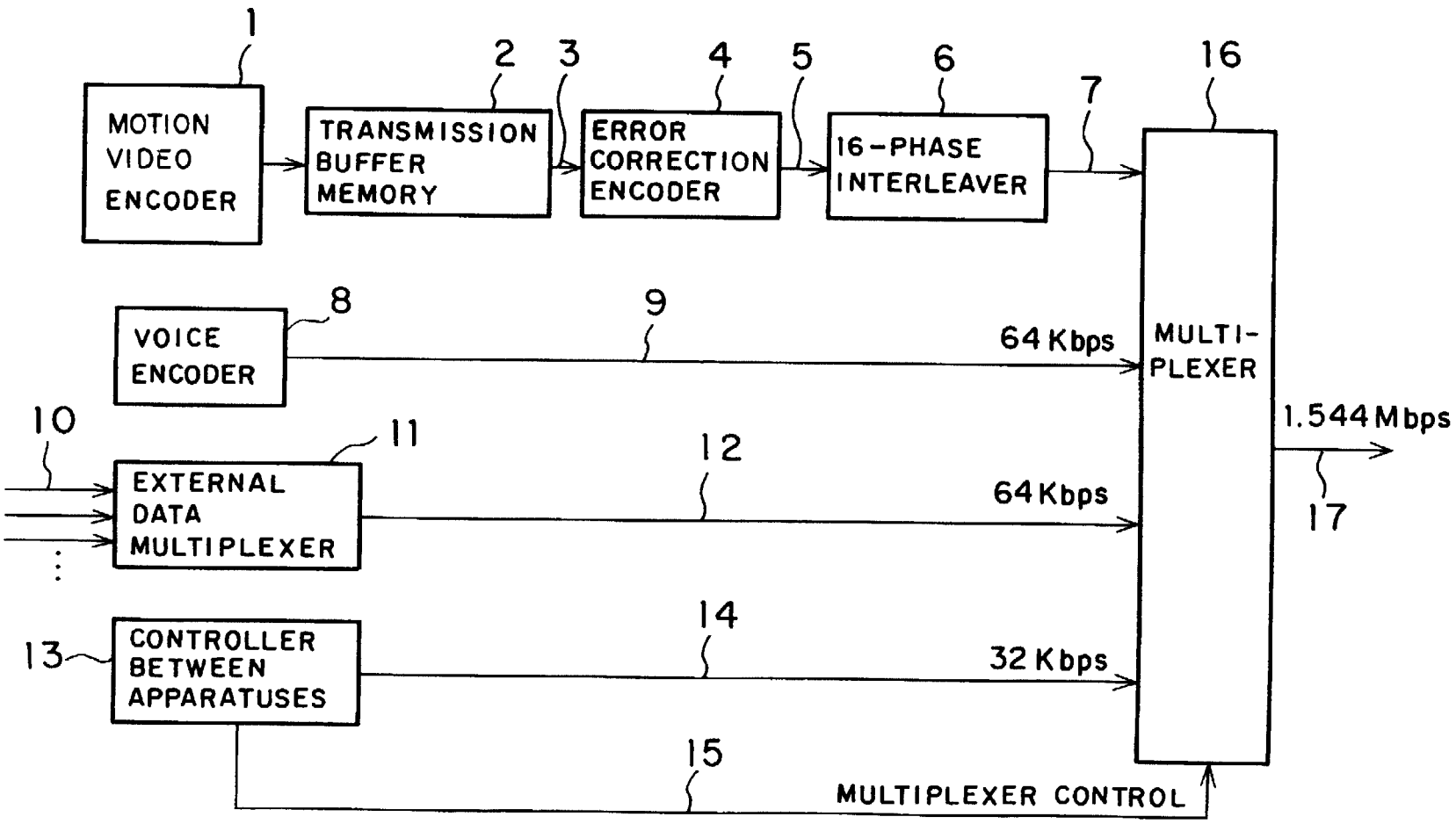
FIG. 8 (PRIOR ART)
FIG. 8 is a configuration diagram schematically showing a conventional sub-rate multi-media data transmission control system.
Figure 9:
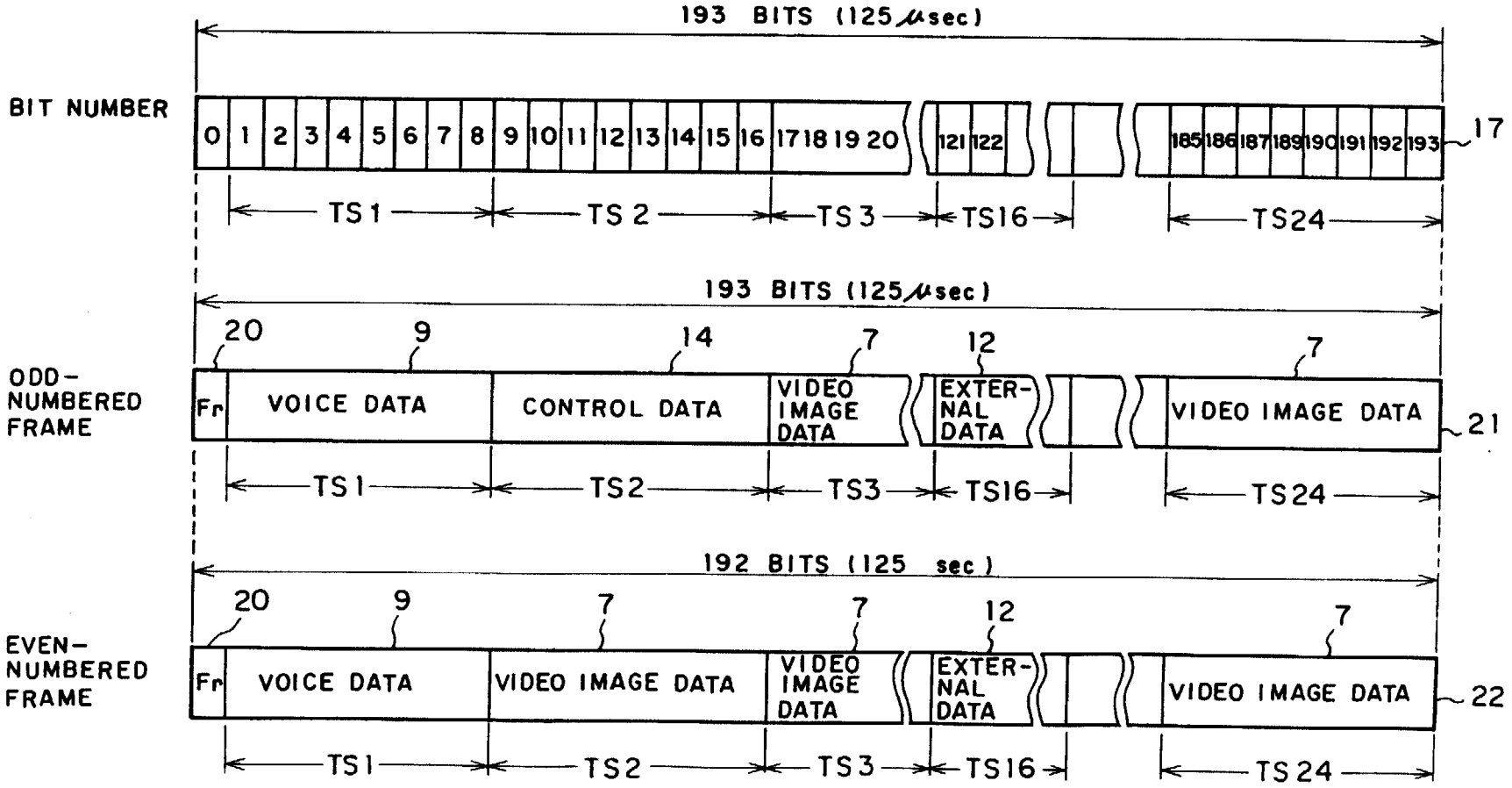
FIG. 9 (PRIOR ART)
FIGS. 9–10 are explanatory diagrams useful to explain the correspondence between the video frame and the error correction frame according to the prior art system.
Figure 10:
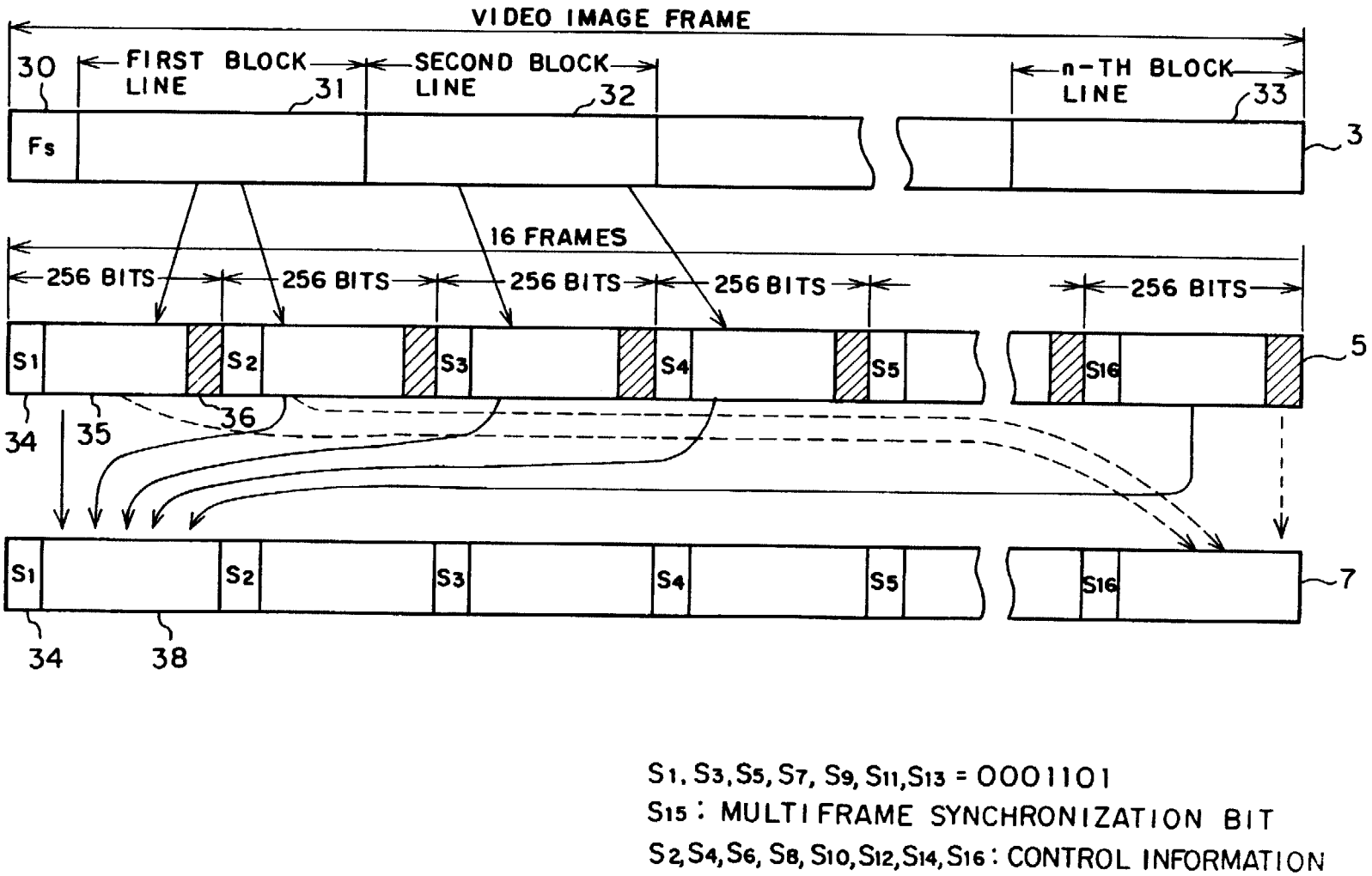
FIG. 10 (PRIOR ART)

FIG. 7 is a diagram showing the correspondence between the [motion] video data frame and the [motion] video data packet 132 of FIG. 4. The configuration includes a [motion] video data frame 160, underflow data 161, a unique code word $F_s$ 162 indicating the top of a video frame of the [motion] video data frame 160, a first data packet 163 following the unique code word $F_s$, an intermediate data packet 164, a final data packet 165, a dummy packet 166 indicating underflow data 161, and an example 167 of a motion video data packet 132 obtained by subdividing the motion video data frame 160.

Next, the operation of the configuration will be described. In FIG. 1, the encoded output delivered from the motion video encoder [10] *101* is smoothed with respect to the speed by means of the buffer memory, the unique code word $F_s$ 162 indicating the top of the [motion] video data frame and the flag $F_f$ 133 are added thereto, and then the obtained data is sent to the error correction encoding section 102 in a unit of the [motion] video data packet 132. The error correction encoder 102 effects the (640, 620, 5) shortened BCH encoding operation on the data in the unit of the [motion] video data packet 132 in synchronism with the multiframe. In this operation, the object of the BCH encoding includes only the bits of the [motion] video data packet 132, namely, the bits assigned to the other items are not encoded and are assumed to be, for example, "1", thereby outputting the resultant data to the multiplexing section 111. On the other hand, the encoded data 105 from the voice encoder 104 is sent to the multiplexing section 111 by synchronizing the multiframe with the voice data frames 150–151 at a rate of 16/8 kbps. The external digital data 106 takes about several minutes for a communication thereof when considering the data of a facsimile, a personal computer, and the like. Only for the communication, the external digital data 106 is multiplexed to generate data of a rate=8 kbps×m (m is an integer at least equal to one) according to the procedure, for example, conforming to the CCITT Recommedations X.50 and the resultant data is then delivered to the multiplexer 111. In the multiplexer 111, the data is multiplexed into a transmission frame 115 of a rate of 64/128 kbps through the bit interleave scheme for each subchannel of 8 kbps which is a rate assigned to a bit of the transmission frame 115, and the resultant frame is then sent to a transmission line. In this operation, the bit allocation or assignment information, the error correction code ECC 140 of the BCH code, and the control data 110 from the transmission controller 109 are multiplexed into the frame bits 121–122 of the transmission frame 115, thereby transmitting the resultant data to the transmission path in a realtime operation. The transmission control section 109 supervising the communication control processing supplies the error correction encode section 102 with the control signal 114 controlling the encode object bits, sends the control signal 113 controlling the transmission rate to the transmission frame configure section 112, and accomplishes communications of the control data 110 with a communicating apparatus.

Referring now to FIG. 2, description will be given of a transmission frame configuration which can be changed over between 64 kbps and 128 kbps. First, assume that the bit speed is fixed to 128 kbps and that a transmission frame 120 includes two octets=16 bits. The transmission frame repeating cycle is obtained as 128 [kpbs/16 bits=8 KHz] *kbps/16 bits=8 KHz* and the bit rate assigned to a bit of a transmission frame is expressed as 1 bit×8 KHz=8 kbps. At the 128 kbps access, the two octets of a transmission frame are entirely used. On the other hand, at the 64 kbps access, only the second octet of a transmission frame is utilized, namely, the first octet is dummy and hence is not used. This utilization method is enabled if the octet synchronization is guaranteed in the transmission line. Next, the last bit #16 of the second octet is assigned as the frame bit and this utilization is repeated in an interval of 80 frames. A multiframe is defined to include 80 frames, which are then classified into even-numbered frames and odd-numbered frames. In the frame bits 1–15 of an odd-numbered frame, eight bits are assigned for a frame synchronization pattern FA, and in the frame bits 17–31, eight bits are assigned for the bit assignment information BA. In the odd-numbered frame, the remaining 24 bits of a field AC including frame bits 33–79 have a capacity of 2400 bps and are assigned to the control data 110. In a case where the transmission line is used with a higher performance or in a sophisticated fashion, while the control data 110 is not being transmitted, another information can be sent by use of the field AC. Next, 20 bits in ECC1 including the frame bits 2–40 of the even-numbered frame are used to transmit 20 error correction bits of the (640, 620, 5) shortened BCH codes, whereas 20 bits of ECC2 including frame bits 42–80 thereof are assigned for a transmission of 20 error correction bits only at the 128 kbps access, and these 20 bits are assigned to the video data 103 at the 64 kbps access.

When allocating of data=8 kbps×l (l is an integer at least equal to one) in the transmission frame, l bits need only be assigned in the frame. For example, for the 16 kbps voice data, two bits of the transmission frame 120 is assigned. The bit allocation information BA 121 is transmitted by use of the BA 121 to the reception side. The remaining bits excepting those required for the items above are allocated for the video data 103. For example, in a case 8 kbps and 8 Kbps are respectively assigned to the external data and the voice data, the bit allocated to the [motion] video data is 42 kbps at the 64 kbps access and 104 kbps at the 128 kbps access.

Furthermore, even when the data access rate of an access from the communicating apparatus is unknown, the synchronization of the transmission frame 120 can be established, which enables it to identify the data access rate of the communicating apparatus from the bit allocate information BA 121. Since the octet timing is supplied from the transmission path, quite a short period of time is necessary to establish the synchronization of the transmission frame.

Referring now to FIG. 3, a description will be given of an example of a dynamic adaptive bit allocation according to the bit allocate information BA 121. It is beforehand assumed that the cycle k (k is an integer at least equal to one) of the bit allocation is determined, that a super frame is defined to include k multiframes, and that the bit allocation is varied in a unit of the super frame. For the synchronization of the super frame, a bit of the frame synchronization pattern FA 121 of FIG. 2 is allocated. As a result, the frame format information to be transmitted depending of the bit allocate information BA 121 is sent in advance in time by a cycle, namely, by k multiframes as compared with the transmission format 124 actually assigned. Consequently, an influence becomes greater when a transmission line error occurs with respect to the bit allocate information BA 121, and hence the same information is successively transmitted k times, thereby effecting a countermeasurement to judge the validity depending on the majority rule.

Referring here to FIG. 4, a description will be given of an example of the correspondence between the transmission frame 115 and the FEC frame as a unit of the (640, 620, 5) shortened BCH encoding operation. Since the number of frames of a multiframe=80 frames, 115 is 640 and 1280 bits respectively at the 64 kbps and 128 kbps accesses, when effecting the 64 kbps and 128 kbps accesses to the FEC frames with a length of 640 bits as a unit of the (640, 620, 5) shortened BCH codes, an FEC frame 130 and two FEC frames 131 are allocated, respectively. As a consequence, when the multiframe synchronization is attained, the synchronization of the FEC frame is automatically established. Next, the video data packet 132 is defined to include the bits allocated to the motion video *data* in the FEC frame. The flag $F_f$ 133 indicating the presence/absence of the filler is added as the first item to the [motion] video data packet 132. Incidentally the utilization method of the flag $F_f$ 133 will be described later in this text. Assuming the number of bits allocated to the other components to be $N_A$ (bits), the number of bits of the video data packet 132 is represented as $640-N_A$ (bits).

Referring now to FIG. 5, description will be given of the correspondence between the FEC frames 130–131 and the error [Correction Code] *correction code* ECC 140 of the (640, 620, 5) shortened BCH codes, the ECCs being distributed in the frame bits. The (640, 620, 5) shortened BCH code is attained by reducing the (1023, [3]*1003*) BCH code by 383 bits and comprise 620 information bits and 20 error [correction] *check* bits ECC 140. The ECC 140 is transmitted with a delay in time by an FEC frame as compared with the FEC flames 130–131. That is, the ECC 140 associated with the previous frame is distributed in the FEC frames 130–131, and the pertinent 20-bit ECC 140 does not undergo the error correction encoding. This is also a countermeasurement to prevent an uncorrectable error of an FEC frame 130/131 from extending into the two FEC frames 130–131. Furthermore, since an error processing is effected by another means for bit information of the transmission frame 115 other than the video data 103, the processing is accomplished on assumption that the bits are to be "1".

In FIG. 6, for the 16 kbps voice data frame 150 and the 8 kbps voice data frame 151, two bits and one bit are respectively allocated for a frame at the 16 kbps and 8 kbps operations, respectively, and the resultant data is interleaved for transmission. On the other hand, also for the video data packet 132, the remaining bits of the transmission frame 115 are assigned and are interleaved for transmission. As a result, the buffer memory need only have a reduced capacity to effect the speed conversion of the voice data 150–151.

Next, since the voice data frames 150–151 respectively associated with 320 bits for 16 kbps and 160 bits for 8 kbps match with two multiframes in the transmission frame 115, the synchronization can be automatically established by attaining the matching with respect to the cycle k of the bit allocate information 123, which enables to effect, for example, a voice activation in this unit.

Referring now to FIG. 7, a description will be given of the correspondence between the video data packet 132 of FIG. 4 and the video data frame 160. A video frame 160 is subdivided (167) from an arbitrary position thereof in a unit of the video data packet 132 and then the unique code word $F_s$ 162 is added as the first item to the video data frame 160 for transmission. In this operation, if the buffer memory of the motion video encoder 101 is in the underflow state, the dummy 166 to be identified by the flag $F_f$ 133 of FIG. 4 is transmitted in a unit of the video data packet 132. However, at a transmission of the final data packet 165, after a video frame data is forcibly transmitted, the dummy is added so as to configure a packet 132. The dummy can be identified in association with the encode operation when the data is received. As a result, the video image delay time at a low bit rate can be reduced and the size of the send/receive buffer memories can be minimized through an optimization of the capacity thereof, which enables the efficient utilization of the transmission line.

Incidentally, although the error correction code ECC 122 is distributed in the transmission frame bits in the embodiment above, the ECC 122 may be arranged in the video data packet 132.

Furthermore, although the unique code word 162 is used to identify the top of the video data frame 160 in the embodiment above, the flag 133 in the video data packet 132 may be extended so as to identify the first item, the intermediate item, the last item, and the dummy of the [motion] video data frame 160 according to a unit of the [motion] video data packet 132.

Moreover, although the 16/8 kbps voice data frames 150–151 are described in conjunction with the embodiment above, the present invention may also be applicable to other transmission speeds such as 64 kbps.

In addition, although the 64/128 kbps accesses with variable rates have been described for the embodiment above, even if the rate is expressed as 64 kbps×$N_1$ ($N_1$ is an integer at least equal to one), the transmission frame 115 need only be expanded in a unit of the octet so as to attain the same effect as the embodiment above.

Furthermore, although the embodiment has been described in case of a transparent communication line, two 64 kbps lines may also be used to obtain the same effect as the embodiment above.

Moreover, although the code length of the BCH code is fixed for each multiframe in the embodiment described above, the code length of the BCH code may be set to be identical to that of the video data packet so as to change the word length depending on the number of allocated bits, which also leads to the same effect as that of the embodiment above.

According to configuration of the present invention, as described above, bits are allocated for a unit of a transmission frame having a frame cycle of 8 KHz, the multiframe cycle is matched with the error correction frame and the voice data frame, the bit allocation and access rate are adaptively variable based on the transmission frame bits, and the video data frame is transmitted in a unit of the video packet; consequently, an apparatus accessing the communication route in a complicated fashion can be configured in a simple structure. Moreover, there are attained effects, for example, a movie image transmission can be implemented with a high picture quality even through a low-bit-rate transmission line.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

What is claimed is:

1. A sub-rate, multi-media data transmission control system in which multi-media data series, including motion video data, voice data, and external digital data are multiplexed and transmitted through a transmission line having a maximum transmission speed of 64 kbps×$N_1$, $N_1$ being an integer at least equal to one, at a variable speed of 64 kbps×$N_2$, $N_1 \geqq N_2 \geqq 1$, comprising:

means for setting a basic transmission frame to $N_1$×8 bits at a frequency of 8 kHz in which a subframe of $N_2$×8 bits is used at said variable speed of 64 kbps×$N_2$ with a dummy subframe of ($N_1$–$N_2$)×8 bits;

multiplexing means for multiplexing said multi-media data series into said transmission frame by allocating ⅛ bits for each data type of said series in said transmission frame, wherein 1 is the transmission speed of each data type in kbps;

transmission speed matching means for setting the number of data bits in a transmission frame to 8 bits×$N_1$ for a transmission speed of 64 kbps×$N_1$, and to 8 bits×$N_2$ for a transmission speed of 64 kbps×$N_2$, forming a multiframe of J transmission [framed] *frames* divided into even and odd numbered frames, J being an integer at least greater than one, and assigning particular frame synchronization data, transmission speed/bit allocation data and control data to a particular bit in each frame of said multiframe in a timesharing fashion thus establishing a frame/multiframe synchronization autonomously matching the transmission speed;

frame synchronization means for setting an integral ratio between the number of bits of voice data allocated in a multiflame and the length of a voice data transmission frame to establish an integrated frame synchronization with respect to synchronization of said transmission frame;

correction encoding means for performing error correction encoding on predetermined bits in a unit of said multiflame;

identification information adding means for subdividing said video data into each unit of said error correction encoding operation and adding information thereto identifying the type of [motion] video data contained therein; and transmitting means for transmitting multiplexed information attained from said multiplexing means at intervals of K multiframes in a real time fashion, K being an integer at least equal to one.

2. A system in accordance with claim 1 wherein said correction encoding means effects an error correction encoding by use of Bose-Chaudhuri-Hocquenghem (BCH) code as an error correction code, said code matching with a bit length of said multiframe so as to arrange error correction bits of said BCH code at predetermined bit positions of said frame bits, thereby achieving the error correction encoding only on said motion video data.

3. A system in accordance with claim 1 wherein said correction encoding means adds information identifying [an] invalid data contained in the [motion] video data obtained through the subdivision in the error correction encoding unit and [motion] video data types including a first item, an intermediate item, and a last item of the video frame to transmission data and transmits a resultant transmission data therefrom.

4. A system in accordance with claim 1 wherein only in a case where said digital data is transmitted in a predetermined period of successive time during an ordinary transmission, a transmission speed of an integral multiple of 8 kbps is allocated for a transmission according to a predetermined procedure, and in the other cases, the transmission speed is allocated to the video data.

5. A system in accordance with claim 1 wherein said identification information adding means effects a voice activation, in case the multiframe is set to an integral multiple of the voice data frame, to identify an interval with a voice and an interval without a voice in a unit of k multiframes, transmits only a voice data frame associated with the interval with a voice, and employs a control increasing the allocation to the voice data in case of the interval without a voice, which is identified depending on bit allocation information in said frame bits in a unit of said k multiframes.

6. A system in accordance with claim 1 wherein when said transmission line has a transmission speed of 64 kbps×2= 128 kbps at the maximum and is capable of a variable-transmission-speed connection for 64/128 kbps, the bits speed is fixed to 128 kbps, the transmission frame length is fixed to 16 bits, all 16 bits of said transmission frame are utilized for a 128 kbps operation, eight bits of said transmission frame are used for a 64 kbps operation, the frame bit of said transmission frame is set to one bit, and the multiframe configuration includes 80 frames.

7. A system in accordance with claim 1 wherein said correction encoding means utilizes as an error correction code a (320, 302, 5) shortened BCH code, a (640, 620, 5) shortened BCH code, or a (1280, 1258, 5) shortened BCH code so as to establish a matching with said multiframe including 80 frames.

8. A system in accordance with claim 1 wherein said transmission speed matching means sets the voice data frame to 160 bits for an 8 kbps operation and to 320 bits for a 16 kbps operation so as to match said voice data frame with a cycle of said multiframe including 80 frames.

9. A system in accordance with claim 6 wherein said correction encoding means utilizes as an error correction code a (320, 302, 5) shortened BCH code, a (640, 620, 5) shortened BCH code, or a (1280, 1258, 5) shortened BCH code so as to establish a matching with said multiframe including 80 frames.

10. A system in accordance with claim 6 wherein said transmission speed matching means sets the voice data frame to 160 bits for an 8 kbps operation and to 320 bits for a 16 kbps operation so as to match said voice data frame with a cycle of said multiframe including 80 frames.

*11. A sub-rate, multi-media data transmission control system in which multi-media data series, including video data, voice data, and external digital data are multiplexed and transmitted through a transmission line having a maximum transmission speed of a predetermined value, at a variable speed less than or equal to said maximum transmission speed, comprising:*

*means for setting a basic transmission frame to a predetermined number of bits at a predetermined frame cycle frequency such that the product of said predetermined number of bits and said predetermined frame cycle frequency is equal to said maximum transmission speed, in which a subframe of less than said predetermined number of bits is used at said variable speed with a dummy subframe having a number of bits equal to the difference between the bits of said basic transmission frame and said subframe;*

*multiplexing means for multiplexing said multi-media data series into said transmission frame by allocating a specific amount of bits for each data type of said series in said transmission frame in accordance with the transmission speed of each data type;*

*transmission speed matching means for variably setting the number of data bits in a transmission frame in accordance with said variable speed, forming a multiframe of J transmission frames, J being an integer at least greater than one, and assigning particular frame synchronization data, transmission speed/bit allocation data and control data to a particular bit in each frame of sai multiframe in a timesharing fashion thus establishing a frame/multiframe synchronization matching the transmission speed;*

*frame synchronization means for setting an integral ratio between the number of bits of voice data allocated in a multiframe and the length of a voice data transmission frame to establish an integrated frame synchronization with respect to synchronization of said transmission frame;*

*correction encoding means for performing error correction encoding on predetermined bits in a unit of said multiframe;*

*identification information adding means for subdividing said video data into each unit of said error correction encoding operation and adding information thereto identifying the type of video data contained therein; and*

*transmitting means for transmitting multiplexed information attained from said multiplexing means at intervals of K multiframes in a real time fashion, K being an integer at least equal to one.*

*12. A sub-rate, multi-media data transmission control system in which multi-media data series, including video data, voice data, and external digital data are multiplexed and transmitted through a transmission line having a maximum transmission speed of 8M kbps×$N_1$, M being an integer greater than or equal to one, $N_1$ being an integer at least equal to one, at a variable speed of 8M kbps×$N_2$, $N_1 \geqq N_2 \geqq 1$, comprising:*

*means for setting a basic transmission frame to $N_1 \times M$ bits at a frame cycle frequency of 8kHz, in which a subframe of $N_2 \times M$ bits is used at said variable speed with a dummy subframe of $(N_1 - N_2) \times M$ bits;*

*multiplexing means for multiplexing said multi-media data series into said transmission frame by allocating l/M bits for each data type of said series in said transmission frame, wherein l is the transmission speed of each data type in kbps;*

*transmission speed matching means for setting the num-*

*ber of data bits in a transmission frame to M bits×$N_1$ for a transmission spee of 8M kbps×$N_1$, and to M bis×$N_2$ for a transmission speed of 8M kbps×$N_2$, forming a multiframe of J transmission frames, J being an integer at least greater than one, and assigning particular frame synchronization data, transmission speed/bit allocation data and control data to a particular bit in each frame of said multiframe in a timesharing fashion thus establishing a frame/multiframe synchronization matching the transmission speed;*

*frame synchronization means for setting an integral ratio between the number of bits of voice data allocated in a multiframe and the length of a voice data transmission frame to establish an integrated frame synchronization with respect to synchronization of said transmission frame;*

*correction encoding means for performing error correction encoding on predetermined bits in a unit of said multiframe;*

*identification information adding means for subdividing said video data into each unit of said error correction encoding operation and adding information thereto identifying the type of video data contained therein; and*

*transmitting means for transmitting multiplexed information attained from said multiplexing means at intervals of K multiframes in a real time fashion, K being an integer at least equal to one.*

*13. A sub-rate, multi-media data transmission control system in which multi-media data series, including video data, voice data, and external digital data are multiplexed and transmitted through a transmission line having a maximum transmission speed of 8 kbps×$N_1$, $N_1$ being an integer at least equal to one, at a variable speed of 8 kbps×$N_2$, $N_1 \geqq N_2 \geqq 1$, comprising:*

*means for setting a basic transmission frame to 1×$N_1$ bits at a frame cycle frequency of 8kHz, in which a subframe of 1×$N_2$ bits is used at said variable speed with a dummy subframe of 1×($N_1$−$N_2$) bits;*

*multiplexing means for multiplexing said multi-media data series into said transmission frame by allocating l bits for each data type of said series in said transmission frame, wherein l is the transmission speed of each data type in kbps;*

*transmission speed matching means for setting the number of data bits in a transmission frame to 1×$N_1$ bits for a transmission speed of 8 kbps×$N_1$, and to 1×$N_2$ bits for a transmission speed of 8 kbps×$N_2$, forming a multiframe of J transmission frames, J being an integer at least greater than one, and assigning particular frame synchronization data, transmission speed/bit allocation data and control data to a particular bit in each frame of said multiframe in a timesharing fashion thus establishing a frame/multiframe synchronization matching the transmission speed;*

*frame synchronization means for setting an integral ratio between the number of bits of voice data allocated in a multiframe and the length of a voice data transmission frame to establish an integrated frame synchronization with respect to synchronization of said transmission frame;*

*correction encoding means for performing error correction encoding on predetermined bits in a unit of said multiframe;*

*identification information adding means for subdividing said video data into each unit of said error correction encoding operation and adding information thereto identifying the type of video data contained therein; and*

*transmitting means for transmitting multiplexed information attained from said multiplexing means at intervals of K multiframes in a real time fashion, K being an integer at least equal to one.*

*14. A multimedia data transmission control system for multiplexing and transmitting various types of media data, including video data, audio data and external digital data, comprising:*

*transmission control means for allocating transmission frame bits, aligning transmission frame patterns, and setting transmission rates adaptively according to said various types of media data presented for transmission;*

*multiplexing means for multiplexing said various types of media data according to transmission frame bit allocation information from said transmission control means; and*

*transmission frame configuring means for configuring multiplexed data from said multiplexing means, and bit allocation and frame alignment pattern information from said transmission control means into transmission frames, and generating multiframes consisting of a plurality of transmission frames, for transmission over a transmission medium.*

*15. A multimedia data transmission control system for multiplexing and transmitting various types of media data, including video data, audio data and external digital data, comprising:*

*transmission control means for allocating transmission frame bits, aligning transmission frame patterns, and setting transmission rates adaptively according to said various types of media data presented for transmission;*

*multiplexing means for multiplexing said various types of media data according to transmission frame bit allocation information from said transmission control means;*

*transmission frame configuring means for configuring multiplexed data from said multiplexing means, and bit allocation and frame alignment pattern information from said transmission control means into transmission frames, and generating multiframes consisting of a plurality of transmission frames, for transmission over a transmission medium; and*

*error correction encoding means for performing error correction encoding on predetermined bits of said multimedia data, and adding synchronization bits to said data as a result of error correction encoding.*

* * * * *

UNITED STATES PATENT AND TRADEMARK OFFICE

CERTIFICATE OF CORRECTION

PATENT NO. : Re. 35,104

DATED : November 28, 1995

INVENTOR(S) : Tokumichi Murakami et al.

It is certified that error appears in the above-indentified patent and that said Letters Patent is hereby corrected as shown below:

On cover page, item [54] and column 1, lines 1-2, The title should be -- SUB-RATE MULTI-MEDIA DATA TRANSMISSION CONTROL SYSTEM --;

In the Claims: Col. 12, line 24 (claim 11), after "of J" insert -- even and odd numbered --; Col. 13, line 3 (claim 12), "bis" should be -- bits --; Col. 13, line 4 (claim 12), after "of J" insert -- even and odd numbered --; Col. 13, line 50 (claim 13), after "of J" insert -- even and odd numbered --.

Signed and Sealed this

Ninth Day of July, 1996

*Attest:*

Bruce Lehman

BRUCE LEHMAN

*Attesting Officer*

*Commissioner of Patents and Trademarks*